US006477535B1

(12) United States Patent
Mirzadeh

(10) Patent No.: US 6,477,535 B1
(45) Date of Patent: Nov. 5, 2002

(54) METHOD AND APPARATUS FOR CONCURRENT DBMS TABLE OPERATIONS

(75) Inventor: Rosita Mirzadeh, Tarzana, CA (US)

(73) Assignee: Computer Associates Think Inc., Islandia, NY (US)

( * ) Notice: Subject to any disclaimer, the term of this patent is extended or adjusted under 35 U.S.C. 154(b) by 0 days.

(21) Appl. No.: 09/200,254

(22) Filed: Nov. 25, 1998

(51) Int. Cl.[7] .......................... G06F 17/00; G06F 17/30
(52) U.S. Cl. ................................ 707/101; 707/8; 700/4
(58) Field of Search ........................ 707/200, 203–206, 707/101, 102, 100, 8, 10; 700/1, 2, 4; 709/200, 201

(56) References Cited

U.S. PATENT DOCUMENTS

| | | | | |
|---|---|---|---|---|
| 5,093,782 A | * | 3/1992 | Muraski et al. | 395/600 |
| 5,437,032 A | * | 7/1995 | Wolf et al. | 395/650 |
| 5,687,372 A | * | 11/1997 | Hoeta et al. | 395/675 |
| 5,694,602 A | * | 12/1997 | Smith | 395/675 |
| 5,754,771 A | * | 5/1998 | Epperson et al. | 395/200.33 |
| 5,761,667 A | * | 6/1998 | Koeppen | 707/101 |
| 5,860,070 A | * | 1/1999 | Tow et al. | 707/8 |
| 5,873,091 A | * | 2/1999 | Garth et al. | 707/102 |
| 5,884,310 A | * | 3/1999 | Brichta et al. | 707/10 |
| 5,887,274 A | * | 3/1999 | Barry et al. | 707/202 |
| 6,122,640 A | * | 9/2000 | Pereira | 707/103 |
| 6,332,167 B1 | * | 12/2001 | Peters et al. | 709/318 |

OTHER PUBLICATIONS

Khermouch "Large Computers", IEEE Spectrum 1995, pp. 48–51.*

Sevcik "Viewpoint: for Commercial Multiprocessing, the Choice is SMP", IEEE Spectrum 1995, p. 50.*

Nicholson "The RISC System/6000 SMP System", IEEE 1995, pp. 102–109.*

Mountassir A Note on Communicating Machines with Identical Symmetrical and Dual Processes using Rewriting Systems, IEEE 1993, pp. 150–157.*

Kleiman et al "Symmetric Multiprocessing in Solaris 2.0", IEEE 1992, pp. 181–186.*

Clark et al "Symmetric Multiprocessing for the AIX Operating System", IEEE 1995, pp. 110–115.*

* cited by examiner

Primary Examiner—Safet Metjahic
Assistant Examiner—Uyen Le
(74) Attorney, Agent, or Firm—Cooper & Dunham LLP

(57) ABSTRACT

Database tables are unloaded by launching a number of threads corresponding to a number of export directories located on separate storage devices that maintain the database tables. Each thread is assigned a database table to unload, and data unloaded from each database table is stored in a corresponding export directory. The data is unloaded from each database table by reading data storage blocks from each table and storing the data logs in the export directory. Each thread is handled by a separate process in a Symmetrical Multi-Processing (SMP) environment. The process is repeated until each database table has been unloaded. The data is then loaded into database tables by first creating a number of temporary tables corresponding to the number of threads, reading a set of data stored in the export directory and storing the data read in a corresponding of the temporary tables by launching a load process for each temporary table. If at any time either the load or unload process is faulted or becomes inoperative, the processes are stopped and an internal TS reorganization concurrent is performed on each table that has not been unloaded and loaded successfully.

51 Claims, 13 Drawing Sheets ent table operations.d
METHOD AND APPARATUS FOR CONCURRENT DBMS TABLE OPERATIONS

BACKGROUND OF THE INVENTION

1. Field of the Invention

This invention relates to a process of unloading and loading a database table. The invention is more particularly related to the application of parallel processing techniques to increase the speed at which database tables are unloaded and loaded. The invention is still further related to parallel processing techniques applied to unloading and loading database tables in a Symmetrical Multi-Processing (SMP) environment.

2. Discussion of the Background

Modern database management systems are increasingly called upon to maintain larger stores of data. In addition to the increased size of databases, the structure within modern databases is increasingly complex.

Typically, a database maintains data in the form of tables, each table maintaining one or more rows of related data. As an example, a basic database table may maintain plural rows having, for example, name, social security number, address and telephone number of individuals belonging to an organization.

The database would be increased in size as the organization adds new members, and would increase in both size and complexity as additional information about members is included. For example, a larger and more complex database could maintain, in addition to the above information, a map, perhaps in graphical format, showing the club members' residence. The database could again be increased in size and complexity by including a work address and an additional graphical map showing the location of the work place.

The database table may again be increased in complexity by maintaining pointers to other tables or rows of the database. For example, a pointer to a set of coworkers maintained in another table, pointers to nearby organization members, or a pointer(s) to any number of items to where additional member data may be maintained.

Conventional Database Management Systems (DBMS) provide space for building database tables by allocating blocks. Once a table is defined, the DBMS will allocate blocks necessary for storing rows of the related data. For example, if a table is to be built to contain 100,000 rows, and the rows of the table were defined such that 100 rows could fit per block, the DBMS would allocate 1,000 blocks to build the table.

Generally, DBMS systems allocate blocks in sets of contiguous blocks. A contiguous set of allocated blocks is commonly referred to as an extent. As a general rule, extents vary in size. Using the above example, the DBMS may utilize a single extent of 1,000 blocks, 2 extents of 500 blocks, or any other combination of extent sizes to allocate the required 1,000 blocks to build the table. Once the required blocks are allocated, the data is then stored in rows in the table utilizing the blocks allocated.

Over the course of time, additional data may be added to the table and the DBMS will allocate additional blocks as required. For example, if a user adds 250 rows to the table, using the above parameters, an additional 3 blocks would need to be allocated.

Also over the course of time, information in the database may be deleted. In this case, deletion of rows occurs through the use of SQL to delete rows from the table. For example, a user may delete fifty rows from block 1, 40 rows from block 20, and 30 rows from block 60. When this occurs, it causes there to be more blocks in the table than required to maintain the data present in the table.

In addition, data within the database will be updated. For example, using the above-described database tables, a organization member who has not yet entered the workforce would have a row in the table allocated that maintained his/her name, address, social security and telephone number. Upon entering the workforce, the row would be updated to include the work address and related information. However, if a substantial amount of information is added as a result of the update, the original row may not have enough blocks of data allocated to maintain the updated information.

Row migration occurs when a row gets updated and the original row does not have enough space to hold all of the updated information. When this occurs, the row is moved to a location with more space, and a pointer is placed in the block where the original row resided, the pointer being set to point to the location of the moved (migrated) row. A large amount of row migration is caused if there are substantial updates to a table and an inadequate amount of space was allocated for the original rows.

More often than not, there is insufficient space within a block to hold an updated row. In this case, the row is migrated to an entirely different block than where the original row resided, and the pointer is placed in the original row position points to the updated row in the different block.

Anytime a row is migrated it causes what is known as fragmentation. Fragmentation causes greatly increased retrieval time of database information because in addition to reading a block, a pointer must be read and interpreted. When a row is migrated to another block, at least two blocks (the block containing the pointer, and the block containing the migrated/fragmented row) must be read to retrieve row specific information. Other structural changes within the database tables also cause fragmentation and related efficiency problems (row chaining, for example).

From time to time, the Database Administrator (DBA) will perform an analysis on the DBMS tables that provides information regarding the condition of the tables. For example, the database administrator may look at information regarding the number of deleted rows to ascertain efficiency information with respect to how many blocks are holding deleted rows. As another example, the Database Administrator may look to see how many rows of a table have been migrated or fragmented by other processes.

If a lot of fragmentation has occurred, it indicates that block size and row space could be more efficiently allocated and that table data is not being retrieved efficiently. When this occurs, the database administrator will likely decide to rebuild the tables.

When creating a table, the DBA makes a decision regarding the structure of a database table by setting a percentage of blocks free (PCTFREE) or percentage of blocks used (PCTUSED). As the DBMS fills up each block with row or table information, it will keep a percentage of a block free at least equal to the percentage PCTFREE.

The DBA sets the PCTFREE variable depending on how the database table is to be used. For example, if a table is to have frequent updates, additional PCTFREE would be established so that enough space is available to allow any necessary row migration to occur within the same block. As discussed above, row migration within the same block does not cause a table to become fragmented. Migrated, but non-fragmented rows are retrieved with a single block read rather than the cumbersome process of reading a block, interpreting a pointer, and reading a second block (or more) as occurs when migrated rows are fragmented. Therefore, appropriate PCTFREE settings allow DBMS performance to be maintained although the database tables may be modified.

PCTUSED is another parameter that allows the DBA to control the structure of a DBMS table. The DBMS prevents additional rows to be placed in a block unless the percentage of that block has fallen below PCTUSED. PCTUSED is different from PCTFREE in the sense that although a block may be used if there is an update, it will not be used to insert a new row unless the percentage used in the block is below PCTUSED.

A DBMS table involved in heavy OLTP activity (inserts, updates and deletes) over time will likely experience row migration, fragmentation, row chaining, etc. Furthermore, various database tables may not necessarily have appropriate settings (PCTFREE, PCTUSED, for example) when first built, or the needs of the database table may have changed, resulting in additional migration, deletion or fragmentation of tables. This in turn results in a degradation of data retrieval performance and space usage.

The DBA will perform an analysis to determine whether the tables are storing data efficiently. As a result, one or more of the DBMS tables may be determined to being inefficient in storing and retrieving data. Reorganization (rebuilding) of the table is a solution to this problem. In order to achieve maximum performance the table needs to be rebuilt (i.e., the data unloaded into secondary space and a fresh instance of the table rebuilt). This process gets rid of many of the unwanted effects mentioned above because the fragmented rows are unloaded and stored without fragmentation in the rebuilt table.

Structurally sound databases make efficient use of disk space. They require less time to access data, reduce the time required for normal transactions, and provide better response time to the user. Even though Oracle and other modern database systems use efficient logic for data placement, normal activity over time causes the physical layout of the data on disk to degrade and space requirements to grow. This results in excessive space usage and extra time needed to perform table scans, database backups, and other functions. Partial empty pages and unused extent space contribute to the additional space usage. Also, nonsequential rows and extent interleaving seriously degrade performance if they are not resolved periodically.

One method to ensure that databases stay efficient (increasing productivity) is to regularly perform reorganizations on the databases' data. Currently, products are available to reorganize DBMS tables.

However, even with automated reorganization tools, reorganization of database tables can require substantial amounts of time. The time required to perform a reorganization can have substantial effects on revenue or productivity of a shop that requires database access. For example, some shops can incur costs of approximately $100,000 an hour when a database is off-line (See December 1997 issue of Oracle magazine, "Reorgs in a Non-Stop Shop," for example). Therefore, any improvement in efficiency or speed at which a reorganization is performed would increase competitiveness and profitability.

SUMMARY OF THE INVENTION

The present inventor has realized the need to provide fully parallel operations supporting database table unloading and loading which will increase the speed of any database operations performing either one or both of table unloading and table loading.

Accordingly, it is an object of the present invention to provide a parallel processing technique that allows for parallel database table unloads.

It is another object of this invention to provide a method for unloading and loading database tables utilizing parallel processing techniques in a Symmetric Multi-Processing (SMP) environment.

It is yet another object of this invention to provide a method for preventing bottlenecks in parallel unloading and loading of database tables.

It is still yet another object of the present invention to increase the speed at which a reorganization of database tables is performed by utilizing the parallel processing techniques of the present invention.

These and other objects are accomplished by a method for performing parallel unloading of database tables, including the steps of launching a number of threads to process the database tables, assigning a respective one of the database tables to a corresponding of said threads and unloading each respective database table by a process of the corresponding thread. The method allows the table unload process to take advantage of a Symmetric Multi-Processing (SMP) environment to significantly improve the speed of database table unloads.

The invention includes a method of parallel loading of table data including the steps of loading data into database tables, including the steps of determining X threads for loading data into database tables, creating X temporary tables, each temporary table corresponding to a set of data stored in an export directory, launching an SQL*LOADER™ process for loading each temporary table, and loading each temporary table with the data stored in the corresponding export directory via the corresponding SQL*LOADER™ process.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

CONCURRENT UNLOAD/LOAD OPTION IN TS REORGANIZATION

The present inventor has developed a new Concurrent Unload/Load methodology. This methodology will be utilized in an Unload/Load option to be introduced in Platinum TS REORG® V2.1.0 to enhance the speed of tablespace reorganization. Previously, the fastest way to reorganize a tablespace in TS reorg was to use Fast Unload in conjunction with the Parallel Direct Load option.

Figure 1:
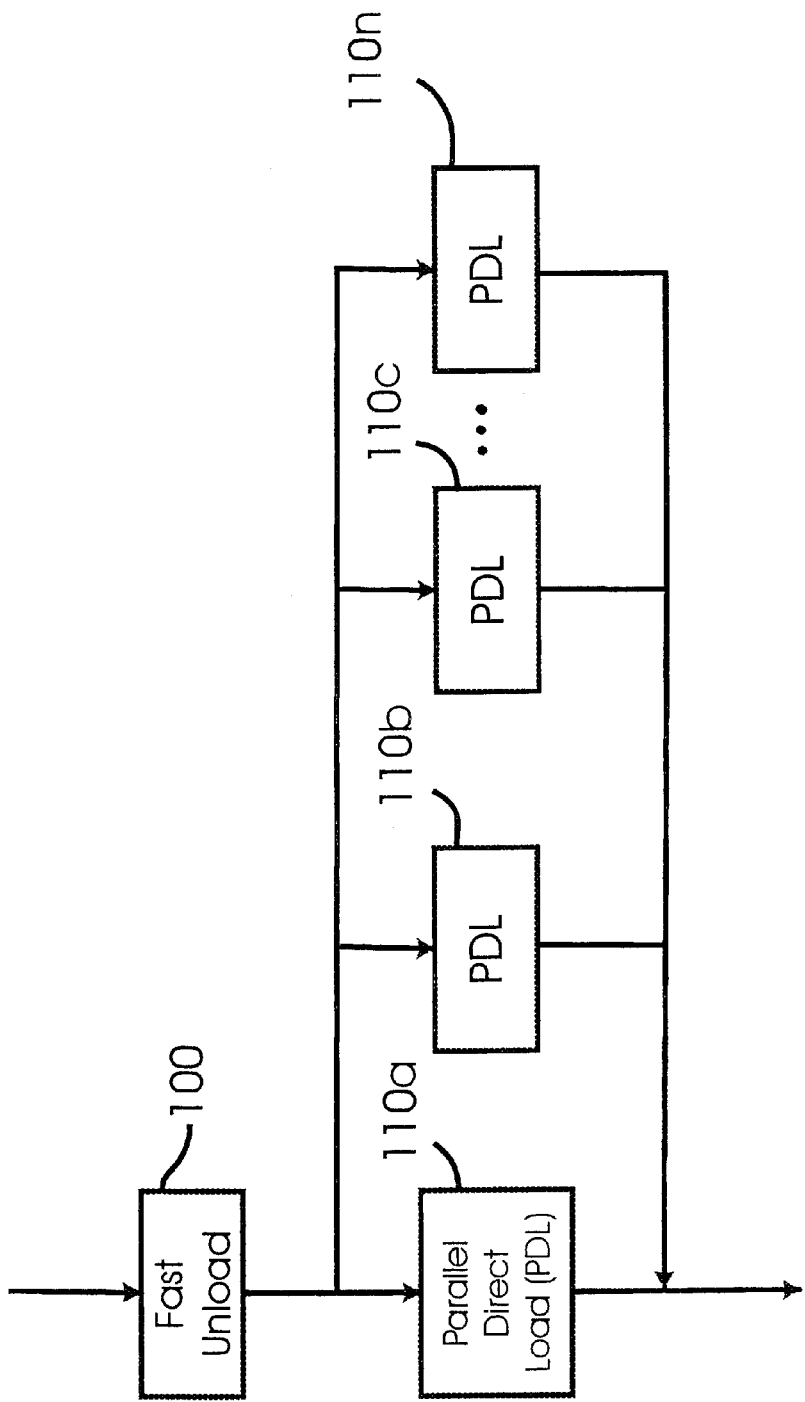
FIG. 1 is a flow chart illustrating a database fast unload/load(PDL)procedure.

Referring now to the drawings, wherein like reference numerals designate identical or corresponding parts throughout the several views, and more particularly to FIG. 1 thereof, is a flowchart illustrating a Fast Unload/Load process. At step 100, a single Fast Unload process unloads each table, and steps 110a ... 110n illustrate parallel direct loads utilized to load tables.

Figure 2:
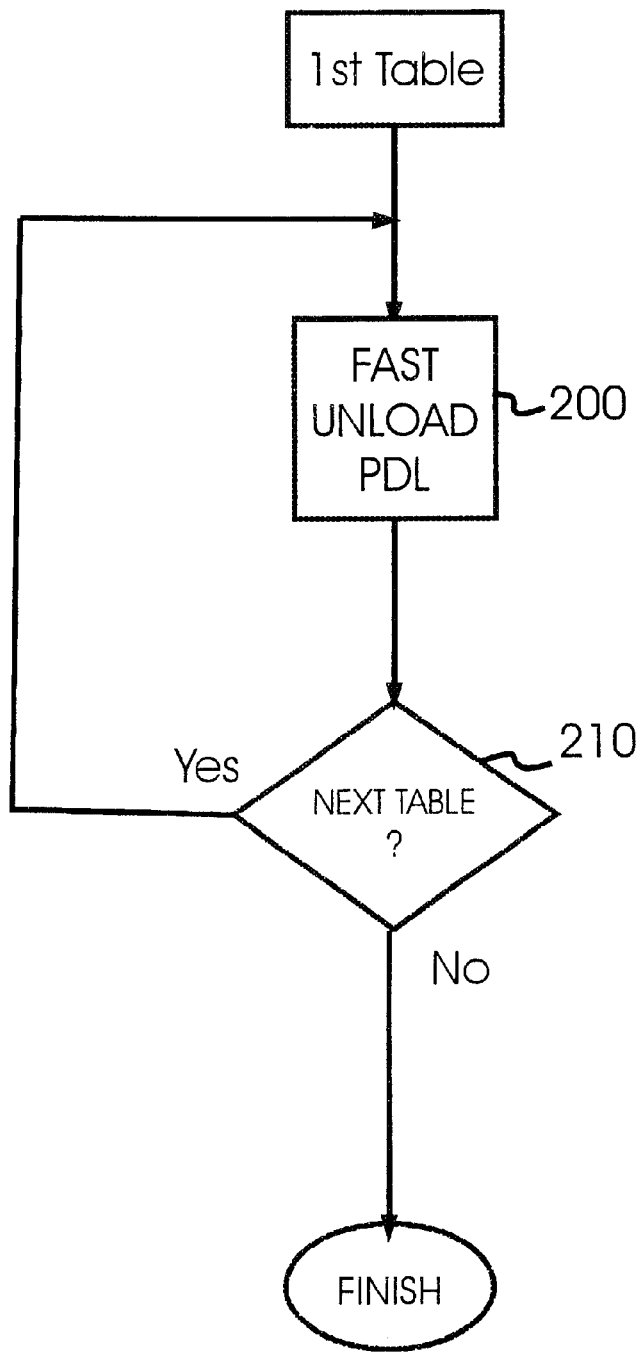
FIG. 2 is a flowchart illustrating the iterative nature of non-concurrent database unload procedure.

FIG. 2 is flow diagram detailing the Fast Unload process. At step 200, a Fast Unload is performed on a table. The Fast Unload reads and stores data from the table. At step 210, it is determined whether a next table in the database(s) is to be unloaded and the process is repeated until each table is unloaded.

As illustrated by the process in FIGS. 1 and 2, in Parallel Direct Load, the tables are unloaded sequentially using one single process on the unload and multiple SQL*LOADER™ (an ORACLE utility) processes on the load, while working on only one table at a time. For example, when unloading a tablespace containing a large number of tables, TS reorg must wait for one table to be completely unloaded before it can process the next table.

Figure 3:
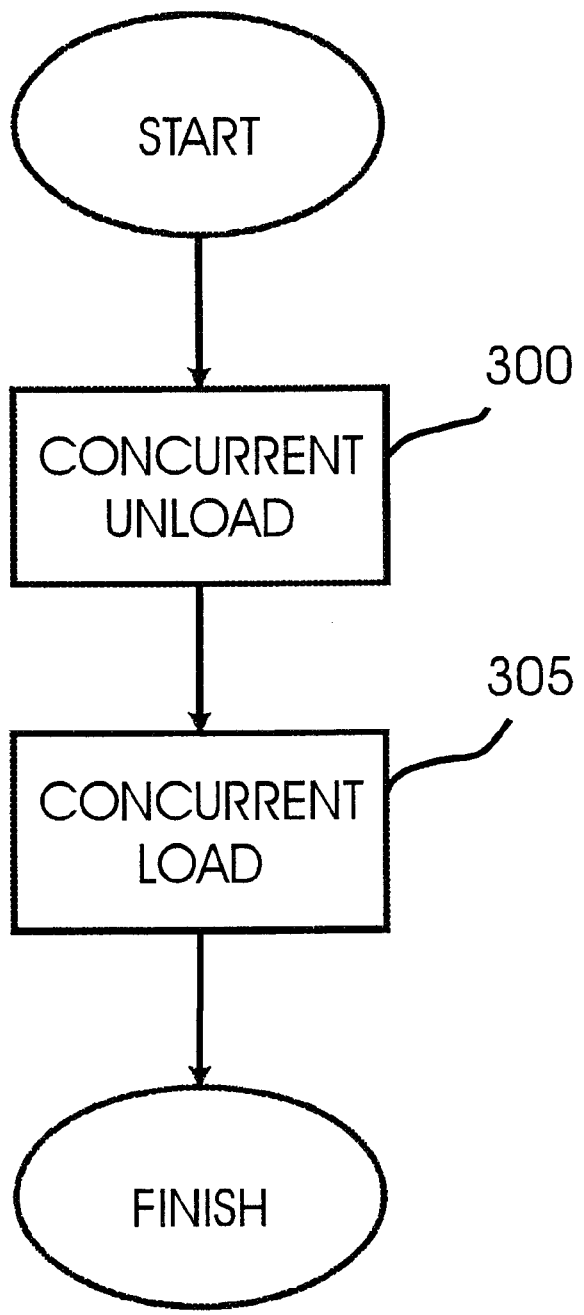
FIG. 3 is a flowchart illustrating high level processes for concurrent load and unload of database tables according to the present invention.

FIG. 3 illustrates the Concurrent Unload/Load option of the present invention that enables a user to take advantage of multi-CPU machines to unload (step 300) and load (step 305) multiple tables concurrently. This method is particularly efficient when the tablespace contains a combination of both large and small tables. Then, while TS reorg unloads and loads one large table, it can also unload and load several small tables simultaneously. The principles of the present invention are also extended to the concurrent building of multiple indexes and/or constraints.

The Concurrent Unload/Load process of the present invention are best practiced in a computing and database environment having the following characteristics:

(1) Symmetric Multi Processing (SMP) computing environment—Appropriate computing hardware contains multiple CPUs and must accommodate a symmetrical multiprocessing environment. The higher the symmetrical multiprocessing capacity of a host machine, the higher performance potential.

One type of multiprocessor computer is a symmetric multiprocessor (SMP) computer. An SMP computer usually has between 2 and 16 processors, all of which share the computer's single memory source and shared storage devices. The SMP capacity depends on the number of processors available. With more processors, the present invention allows more queries and loads to be performed in parallel.

(2) Datafiles partitioned across multiple disks—The datafiles of the tablespace to unload reorganization must be stored on different physical disks. This requirement is needed to obtain full benefit from the Concurrent Unload/Load processes of the present invention.

(3) Defined export directories on disks—A number of threads used for the Concurrent Unload/Load option processes will be less than or equal to the number of export directories. These directories are best utilized when residing on separate physical disks.

Even with a high SMP capacity and efficient parallel operations, data movement can experience a bottleneck, or a halting reduction in speed, because of the limited bandwidth of physical storage disks. One of the few limitations of SMP occurs when physical disks cannot quickly accommodate the simultaneous read and write requests made by the numerous CPUs.

Another source of interrupted data, especially in parallel processing, is disk contention. When multiple processes attempt to access and change a database, the disk head can serve the request of only one process at a time, causing the other operations to wait. This situation of two processes simultaneously trying to access the same disk is called disk contention. The result of disk contention is clogged data, or a bottleneck.

Since parallel processes use multiple CPUs to move data between memory and disks, it is important to have multiple disks defined, so that the numerous CPUs can quickly move the data without interruptions or waiting.

One way to eliminate bottlenecks is by partitioning the data to multiple disks. Partitioning data is the process of physically spreading the data across multiple disk drives to reduce the limiting effects of disk I/O bandwidths and disk contention. The more disks you define (partition) for data export, the more you reduce I/O bottlenecks, which results in faster parallel operations.

Figure 4:
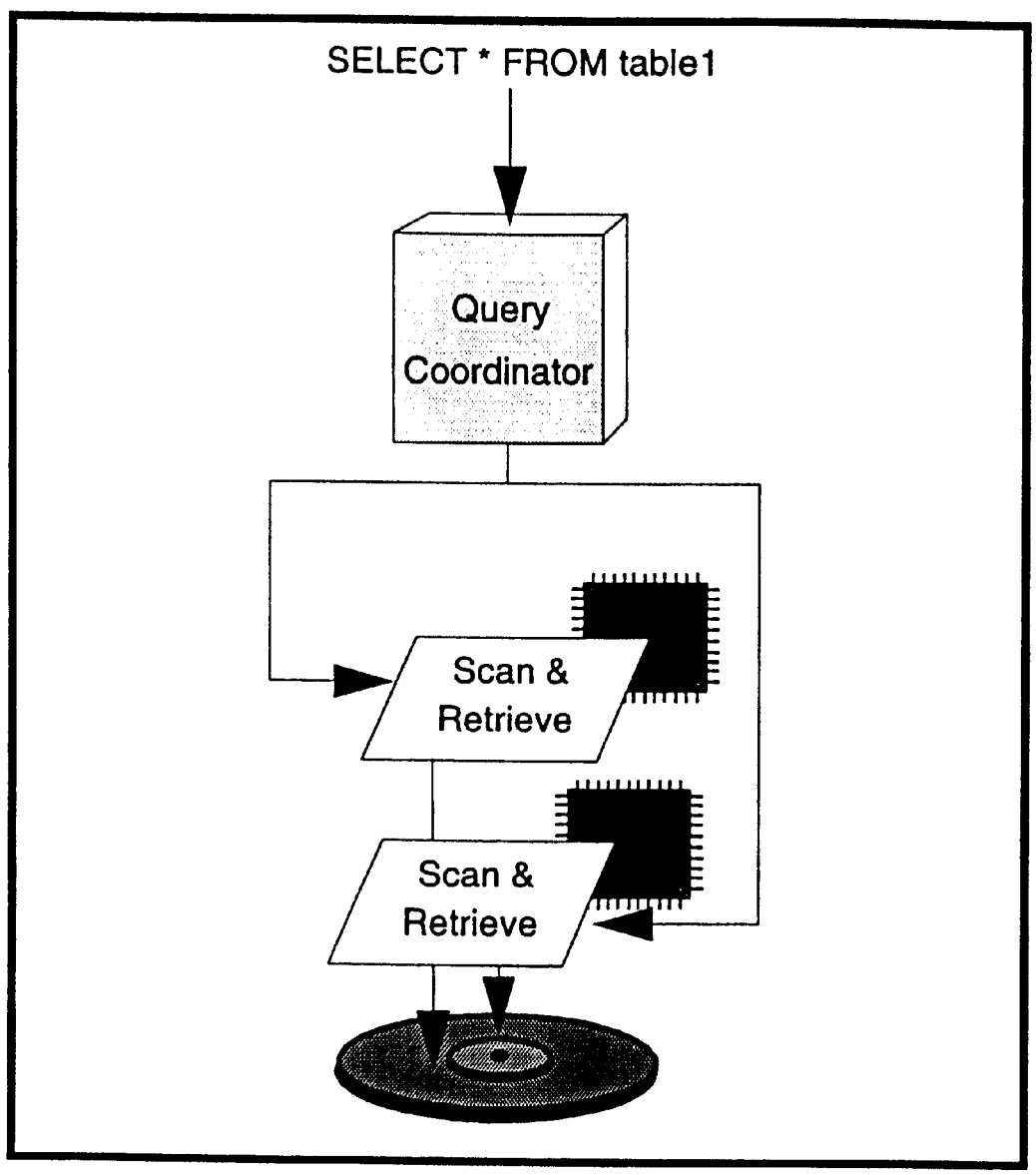
FIG. 4 is an illustration of parallel processes performed on a single export disk.

FIG. 4 illustrates parallel processes using only one export disk. Even though the server's query coordinator breaks the query into two separate operations, the disk head can serve the request of only one scan at a time, causing the other operations to wait, or bottleneck. In this example, the single disk's I/O limitations defeat the purpose of the server's parallel process features. Resolving this problem depends on proper disk allocation.

Figure 5:
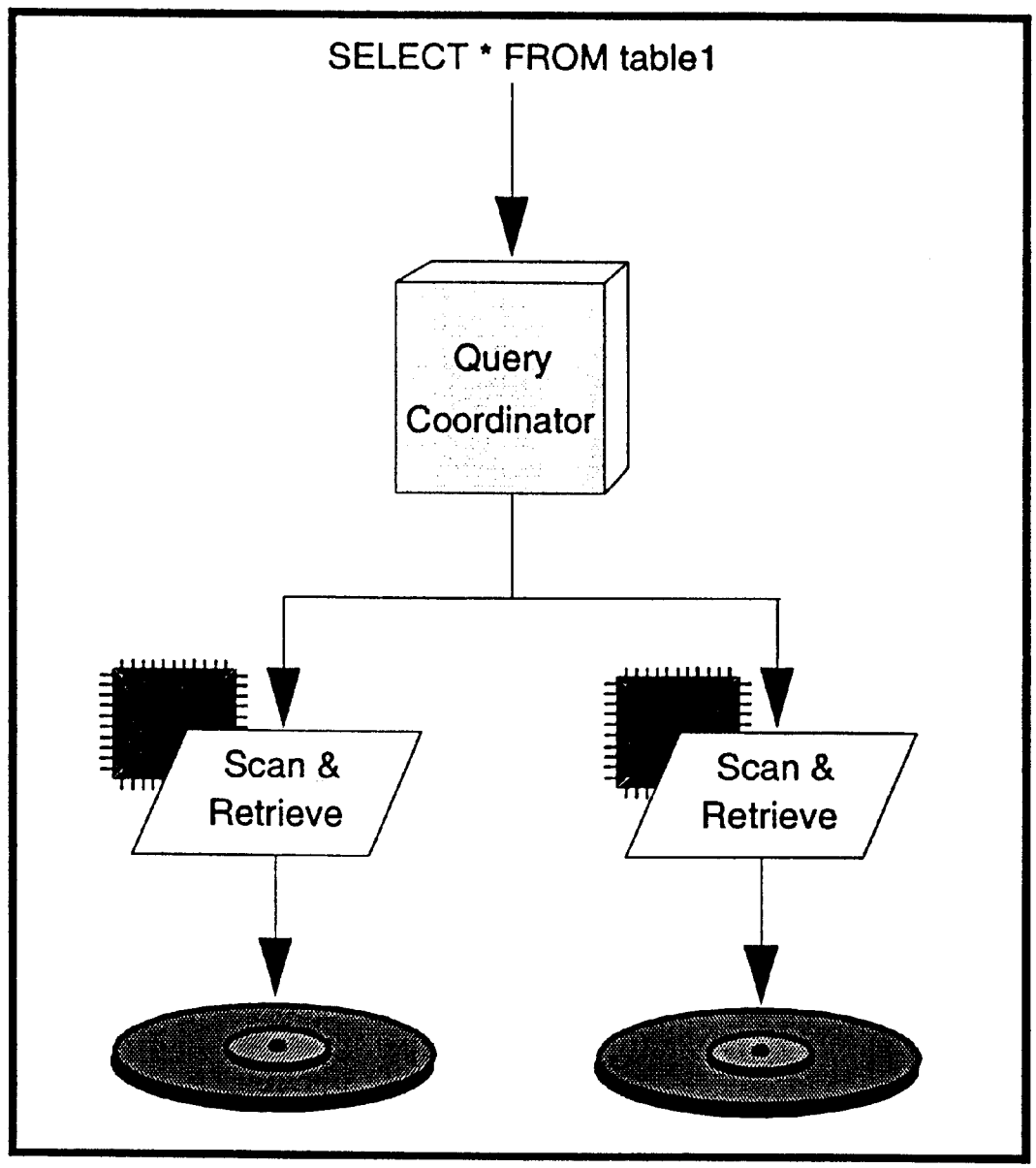
FIG. 5 is an illustration of parallel processes performed using multiple export disks according to the present invention.

FIG. 5 illustrates one embodiment of a proper disk allocation, and parallel processes using numerous export disks (partitioned data). The parallel processes run simultaneously, rather than one process waiting for the other.

Using Concurrent Threads in TS reorg

The Concurrent Load/Unload processes of the present invention utilize a number of defined threads that determines a number of tables to be unloaded/loaded at the same time. In other words, the number of concurrent threads is equal to the number of processes that TS reorg launches in the unload and load phase. Each of these processes works on one table.

Figure 6:
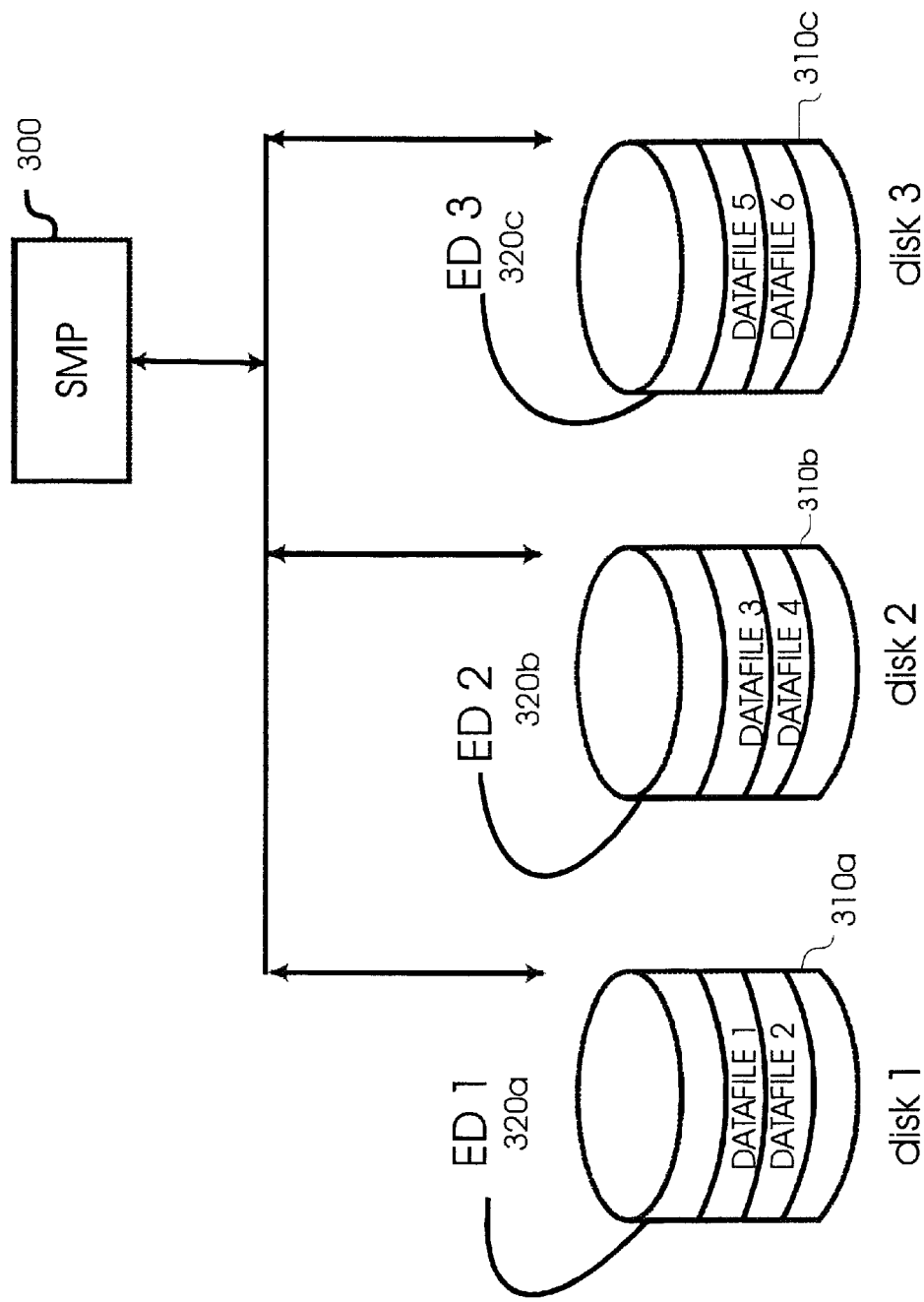
FIG. 6 is an illustration of plural storage devices maintaining database tables and export directories according to the present invention.

The number of defined threads is limited by a number of export directories. FIG. 6 illustrates an SMP computing environment having three separate disks, 310a, 310b, and 310c, each disk storing datafiles and each having an export directory 320a, 320b, and 320c. In the illustrated environment the Concurrent Load/Unload would define three threads (one per export directory) for unloading tables.

Concurrent Unload Phase

Figure 7:
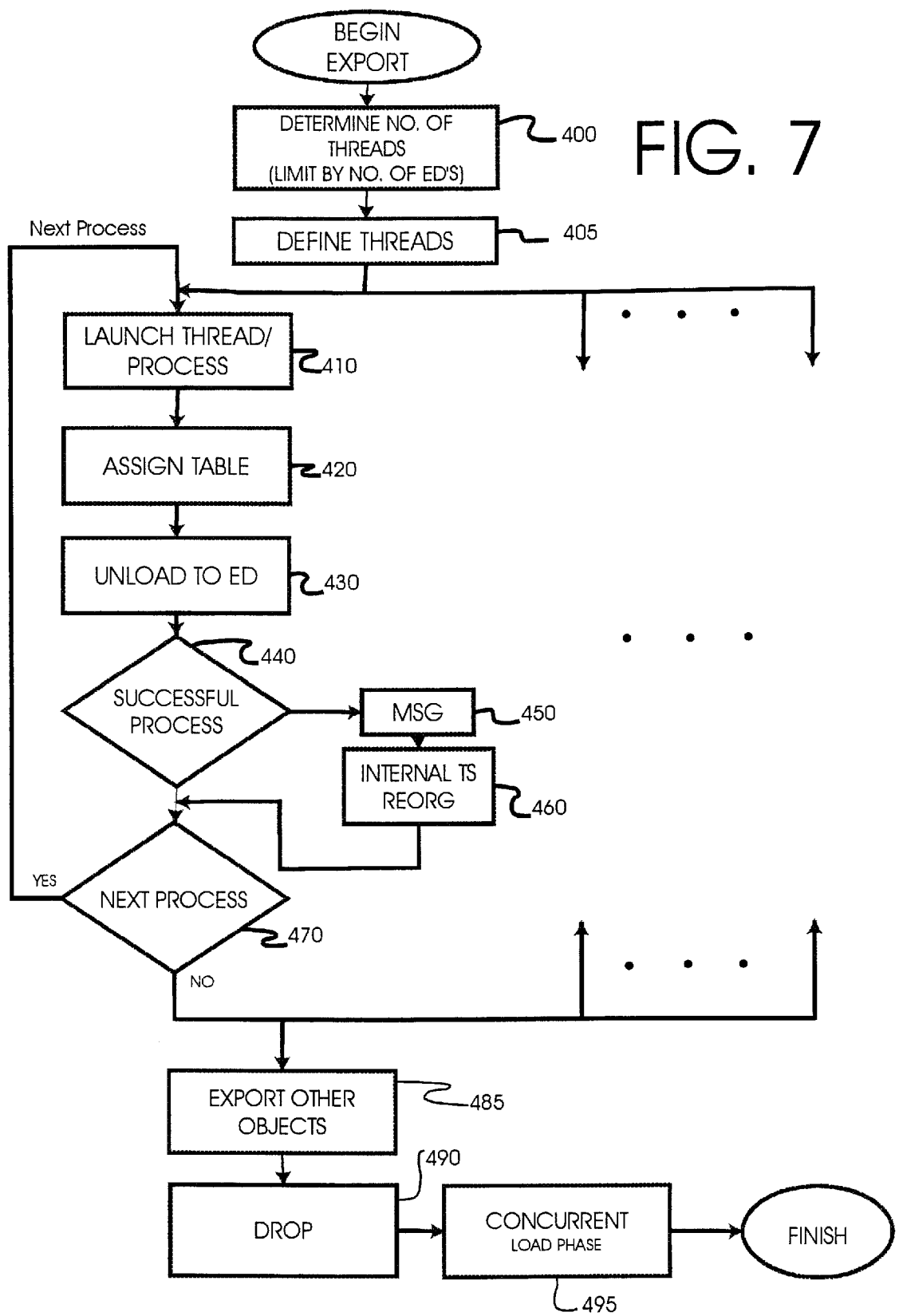
FIG. 7 is a flowchart illustrating export (unload) process according to the present invention.
Figure 8:
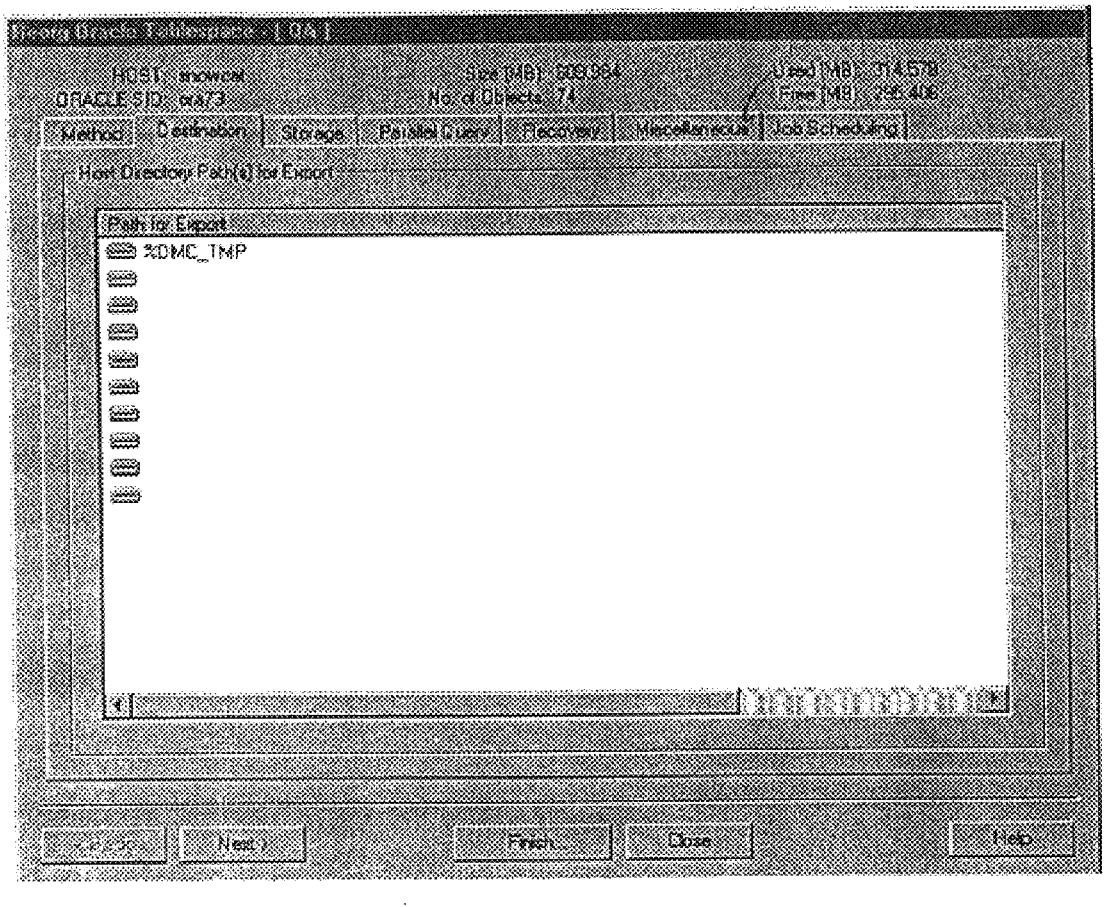
FIG. 8 is an illustration of a Destination Tab Property Page according to the present invention.

FIG. 7 is a flowchart illustrating the Concurrent Unload phase of the present invention. At step 400, a number of threads to be utilized in a current computing environment is determined. The number of threads to utilize is provided by a user via a GUI or other input device. However, the number of threads is also limited to a maximum equivalent to a number of export directories residing on separate disk drives. For example, TS reorg now utilizes a destination Tab Property Page to enter, change or delete the export directory paths designating the location for the unloaded data and other export files during a tablespace reorg (see FIG. 8).

During the export phase of a tablespace reorg, the reorg utility unloads the Data Description Language (DDL) and table data from the tablespace and exports it to a specified directory. The Host Directory Path(s) for Export is the directory path designating the location for the unloaded DDL and data during a reorg.

The Destination tab property page is utilized to do the following:

Add a host export directory.
Delete a host export directory.
Modify a host export directory.

If insufficient space available in the export directory or the export file size reaches the ulimit while the reorg utility is unloading data, the reorg utility exports the remaining data to the next specified export directory. If another export directory is not specified, the TS reorg will not perform the reorganization.

This removes the 2-gigabyte limit common on most UNIX platforms. Since a compressed file cannot be split, this does not apply to a compressed export method (described hereinafter).

At step 410, TS reorg launches a same number of Fast Unload processes as the number of defined threads. This is referred to as the first set of Fast Unload processes At step 420, a table is assigned to each process. Each Fast Unload process is executed by the corresponding thread and unloads the assigned table into one of the separate export directories (step 430).

To search for a directory on which to unload data, each thread checks all of the export directories and chooses the smallest available directory that can accommodate the created export file. Such a method is known as finding the best fit for the export directories. Once a thread finds a best fit directory, it claims that directory, so the next thread must choose another.

In the event that other applications are using space on the same file system, a thread might not load all its data into its chosen best fit directory. If this occurs, the reorg utility splits the export file into multiple export files and attempts to write it on another export directory. If there is no alternate export directory, or if the disk is full, the thread terminates and one of the remaining threads unloads the remaining data.

A user may estimate the size of the user's export files in order to assign enough space in an export directory for those files. To estimate the size of an export file, divide the current allocation of an object by the number of threads to be utilized.

Figure 9:
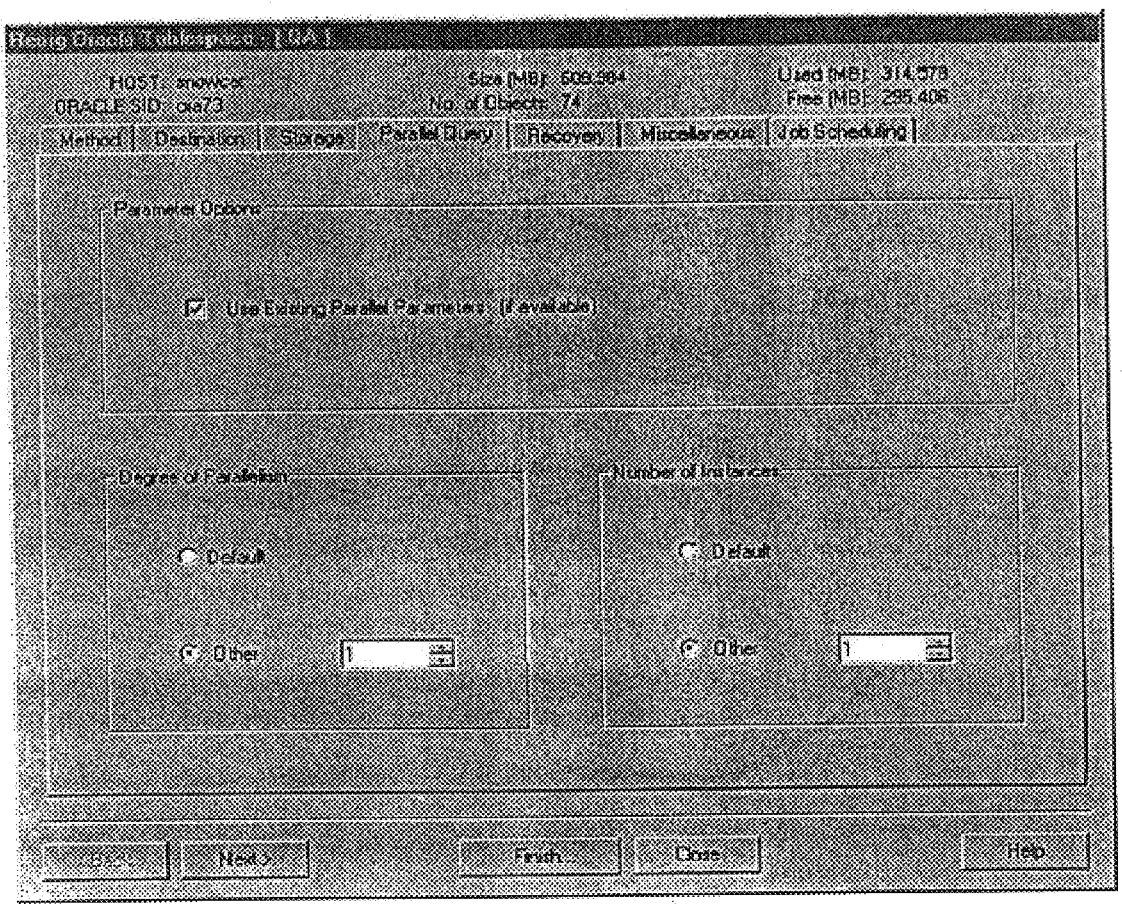
FIG. 9 illustrates a Parallel Query Tab page according to the present invention.

The reorg utility utilizes a Parallel Query tab property page, as shown in FIG. 9, to fill in fields along with any existing parallel parameters for the object. For example, a table's parallel parameters might exist if that table was initially created or revised using parallel parameters. Those parameters are retained within the table's Data Description Language (DDL) and the Data Dictionary. If parallel parameters already exist for an object, the reorg utility splits the data query automatically, and a user need not specify values in the Parallel Query tab property page. Otherwise, the reorg utility splits the query according to the parameters set in the Parallel Query tab property page.

For full advantage of the present invention, the number of export directories is equal to or greater than the number of threads. Also, each export directory should reside on a separate physical disk to avoid disk I/O bottlenecks. As discussed above, I/O bottlenecks will likely occur if more than one export directory is located on a same disk because of the possibility of more than one process writing (unloading) to the same disk at the same time.

When the first Fast Unload process of the first set of threads finishes, TS reorg checks if the process was successfully terminated (step 440), if that was the case, the next Fast Unload process to unload a next table is launched (step 470).

In this manner, each table is unloaded by a process executed in it's respective thread. Each thread is independent, therefore if one thread has a process assigned to a large table, the other processes need not wait for the large process to finish before launching the process for the next table.

Otherwise, if a problem occurred during the unload of the table, TS reorg displays a reason why the process failed (step 450), along with eventually the Fast Unload logfile in the job logfile. The table that a problem occurred is unloaded using an internal unload program of TS reorg. This unload program is not launched as a separate process and therefore it has to be finished before TS reorg can continue with the concurrent unload of the rest of the tables.

Once all the tables have been successfully unloaded, the unload process is completed. A performance meter (estimated, or interactive) may also be implemented to display the speed of unload/load operations and an amount of disk space being consumed.

Once the unload process is completed, TSreorg continues with the next step of the tablespace reorganization which is the export of other objects of the tablespace (step 485).

Export of other objects includes the creation of a files for storing the DDL of the tablespace including all indexes, triggers, constraints, and primary or unique keys (everything except the table and clusters).

Finally, TS reorganization performs a drop on the unloaded tables (step 490), and then performs a concurrent load (step 495) loading the unloaded data into fresh tablespace.

Concurrent Load Phase

Figure 10:
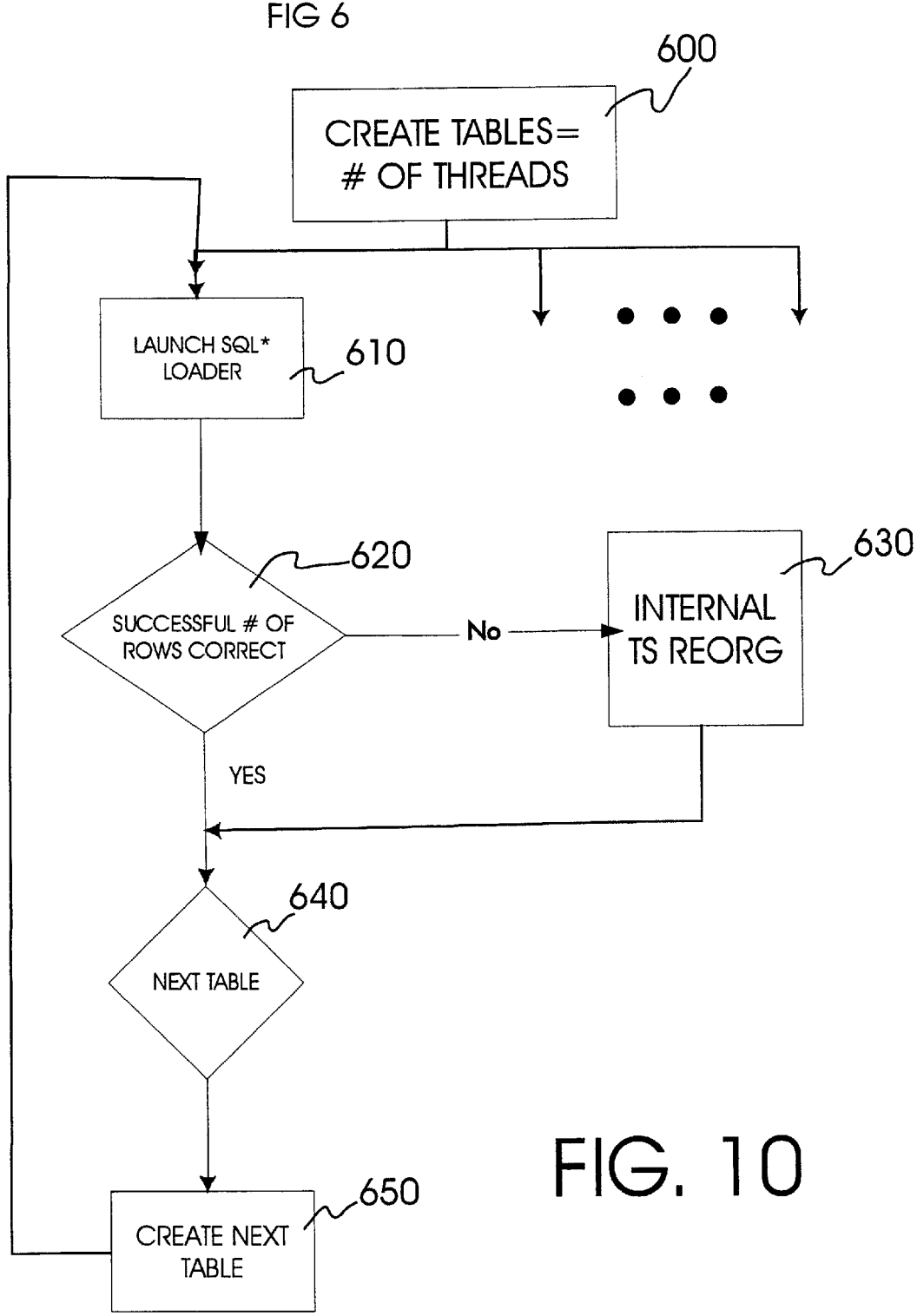
FIG. 10 is a flowchart illustrating a parallel load process according to the present invention.

After dropping all of the tablespace objects, TS reorg begins the load (import) phase of the reorganization. The concurrent load phase is illustrated in the flowchart of FIG. 10. At step 600, TS reorg begins the load phase by creating tables to store the data. TS reorg sequentially creates as many tables as the number of threads specified. The specified number of threads is equivalent to the number of threads in the unload phase.

After the first set of tables is created, TS reorg simultaneously launches the SQL*LOADER™ processes used to load the data of each corresponding table. The number of processes launched is equal to the number of threads. Each SQL*LOADER™ process loads data for one corresponding table, reading table data from an export directory and loading that data into the corresponding table (step 610).

The reorg utility recreates the objects, eliminating fragmentation and optimizing storage parameters, using the DDL in the export files. The reorg utility coordinates multiple CPUs in parallel threads to load the data back into the objects, resulting in a reorganized tablespace.

After one of these processes is completed, TS reorg checks if the data was successfully loaded back into the table and if the number of rows inserted was correct (Step 620). If an error occurred during the load or the number of rows inserted by SQL*LOADER™ was not correct, TS reorg switches automatically to the internal TS reorg load function to load sequentially the data before continuing with the next table (step 630). If there was no error with the SQL*LOADER™ process, or after the internal load terminated without error, TS reorg creates the next table (step 650) and launches concurrently still another SQL*LOADER™ process to load this table's data (repeating step 610).

Figure 11:
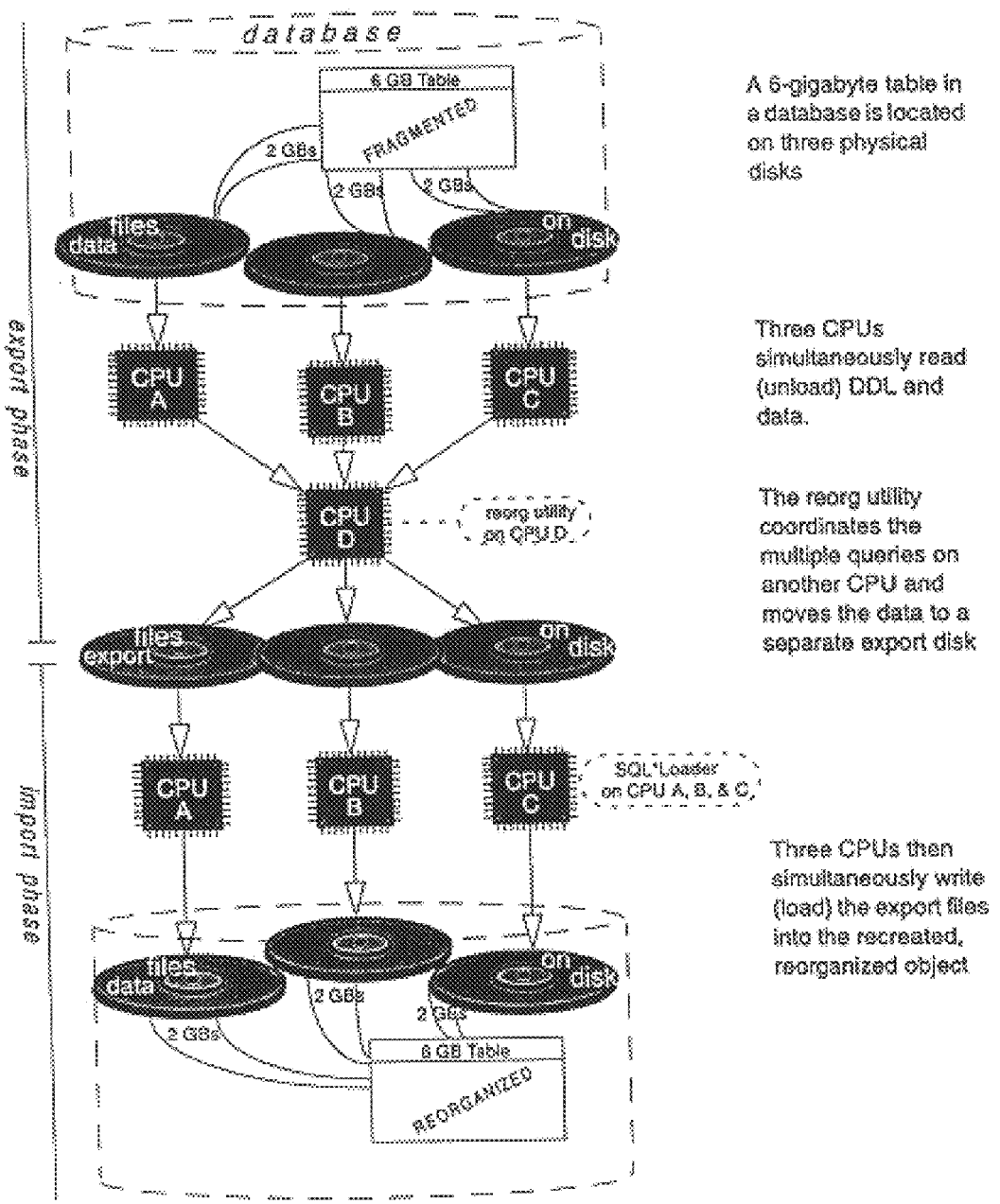
FIG. 11 illustrates a Concurrent Table Reorganization with a parallel export phase and a parallel direct load according to the present invention.

As illustrated in the concurrent Table Reorganization diagram shown in FIG. 11, a concurrent direct load invokes multiple CPUs, each of which executes a separate SQL*LOADER™ session to synchronously load data from the export files back into the object's datafiles. When SQL*LOADER™ writes to these datafiles, the reorg utility uses the best fit method, which selects those partitioning directories that have enough space to accommodate the incoming data. The reorg utility then continues using the best fit method within that selected list of directories and chooses the smallest datafile that can accommodate all of the incoming data for the thread. Each thread loads its data into as much free space in a datafile as it can.

Figure 12:
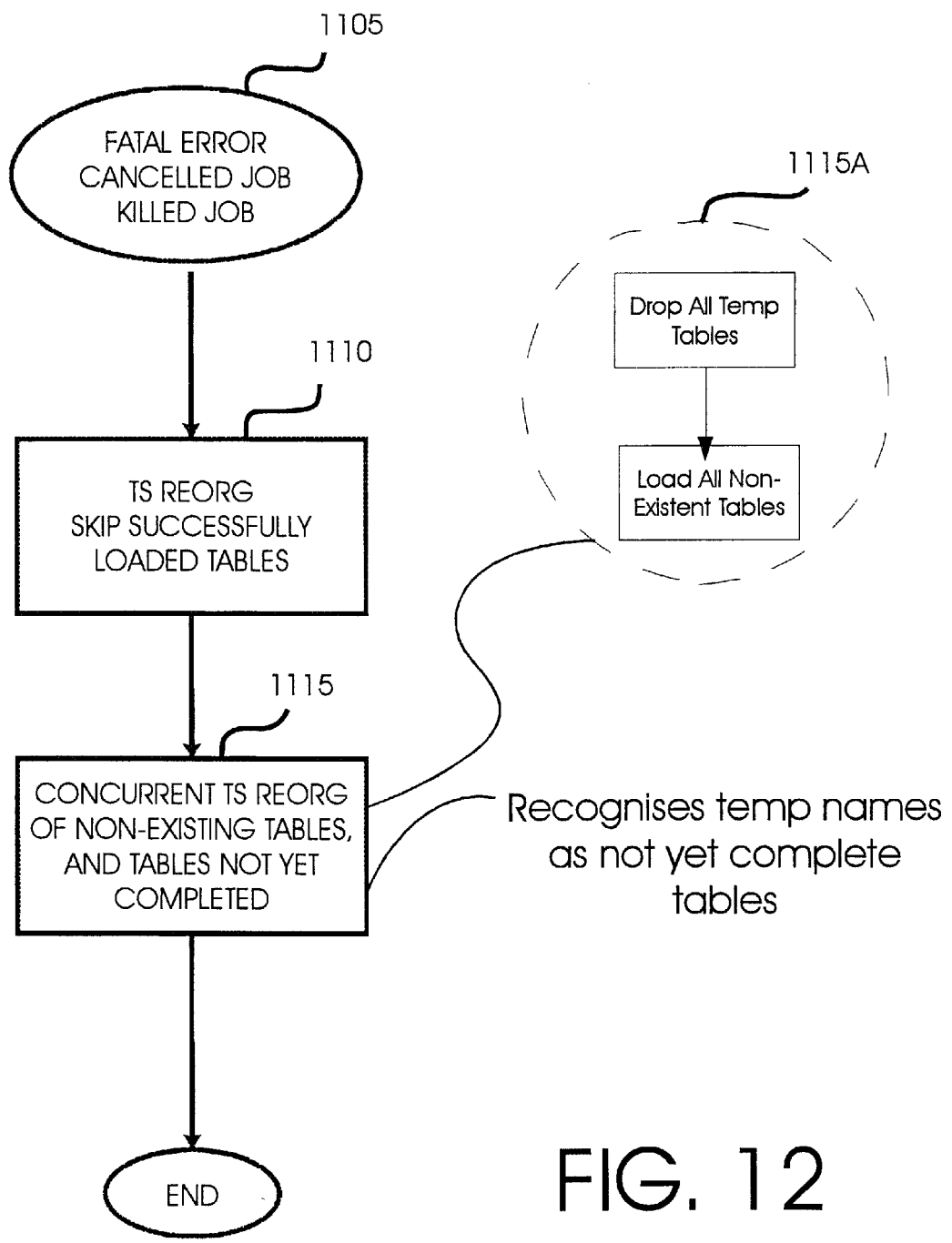
FIG. 12 is a flowchart illustrating a fail safe/fault recovery system for the unload/load processes according to the present invention.

If a fatal error occurs during the load phase, or if the reorganization job is canceled or killed for any reason, the failed job becomes a job that needs recovery. As shown in FIG. 12, after a job has failed (step 1105), TS reorg automatically skips all the tables that have been already successfully created and loaded before the failure (step 1110) and only loads concurrently the non-existing tables or the tables that were not completely loaded (step 1115).

Figure 13:
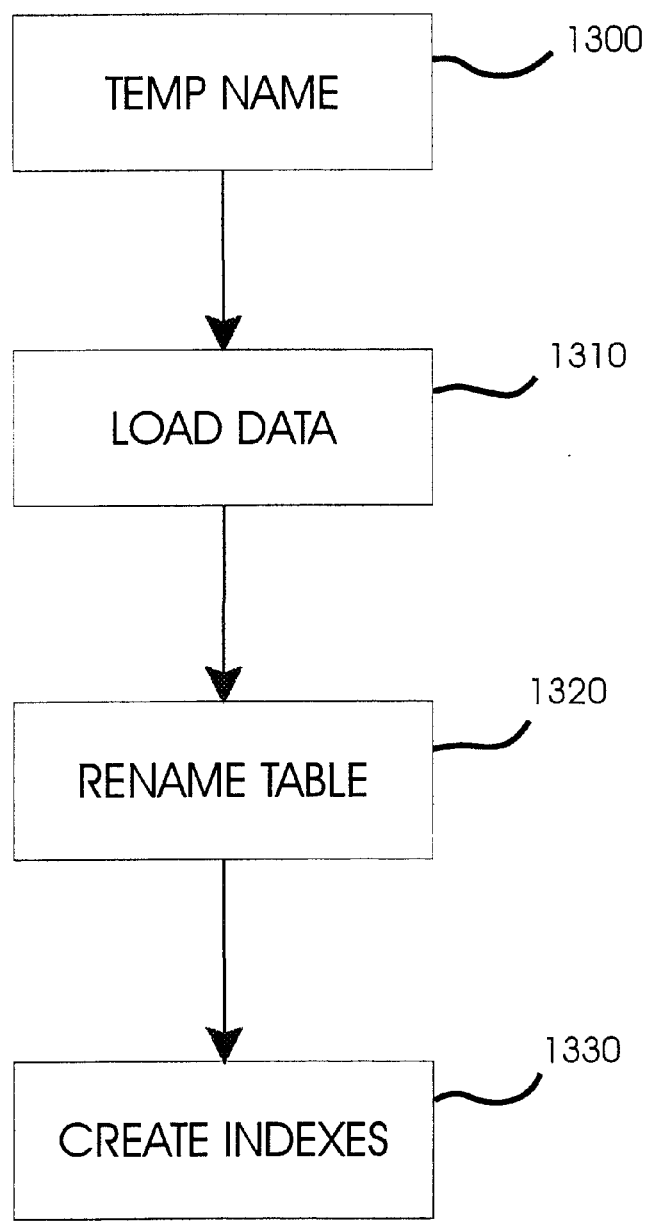
FIG. 13 is a flowchart illustrating high level table name and loading processes according to the present invention.

As shown in FIG. 13, during the load phase, TS reorg first creates the tables under a temporary name (step 1300). After the data has been reloaded the temp table is renamed to the original name of the table (step 1320). Finally, the primary constraints and indexes on the table are created (step 1330). This allows TS reorg to recognize the tables that were not completely imported before the failure and to drop all temporary tables and restart the load for those tables (see process 1115A, FIG. 11).

When using the Concurrent Unload/Load option, TS reorg automatically selects the option: Create all Indexes/Constraints after all of the Tables have been Created. The indexes and constraints of this tablespace are created after all of the tables are successfully created and their data reloaded into the tables.

CONCURRENT INDEX CREATION IN TS REORG

Concurrent index creation is an option can be used in a table or a tablespace reorganization to increase the speed of index creation during the reorganization. In a regular table or tablespace reorganization, the indexes are created one after another after the table is created and the data loaded back into the table.

In a tablespace reorg, the user may select a concurrent index creation option. In this case, TS reorg will create the indexes concurrently (sequential index creation is the default behavior). This will allow TS reorg to gather all the indexes and constraints in one export file and when all the tables of the tablespace (in case of a tablespace reorganization) or the table to reorganize (in case of the table reorganization) has been created, it starts to create these indexes and constraints concurrently.

When selecting this option, the user has to specify a number of threads which would be used as the number of process to launch concurrently during the index/constraint creation phase.

When the import phase for indexes begins, TS reorg launches the same number of Index creation processes as the number of specified threads. When the first index process of the first set of threads finishes, a next index creation process is launched and subsequent index creation processes are similarly launched upon completion of other threads until all the indexes and constraints are created.

If an error occurs on the creation of one index or constraint, TS reorg logs the error and writes the DDL of the failed index into a file. The user can then manually edit and fix the problem.

The present invention has been described with reference and in terms consistent with an implementation in conjunction with a Oracle database. However, the processes described are equally applicable to other known database products and custom database installations. For example, instead of utilizing the Oracle utility, SQL*LOADER™, another program capable of reading table data stored in an export directory and loading the data into fresh table space may be utilized.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, database engines and products, and user applications. Ultimately, such computer readable media further includes software for performing the present invention, as described above.

Included in the programming (software) of the general/specialized computer or microprocessor are software modules for implementing the teachings of the present invention, including, but not limited to, retrieval of user inputs and the determination of a number of threads for parallel processing, launching threads, unloading database tables, determining success, initiating internal reorganization processes, exporting database objects, compressing unloaded data, monitoring the processes of the present invention, and setting up a concurrent load environment utilizing a table load utility, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. A method for reorganizing database tables in a symmetrical multi-processing environment having a plurality of CPU's, comprising the steps of:

launching a number of threads to process said database tables;

assigning each of said database tables to a different corresponding thread of said threads;

unloading each respective database table by a process of said corresponding thread, wherein said threads operate on different CPU's in parallel; and loading said database tables.

2. The method according to claim 1, wherein said step of launching includes the steps of:

retrieving a number of threads input by a user;

identifying a number of export directories located on separate storage devices that maintain said database tables;

limiting to the number of export directories identified; and utilizing as said number of threads.

3. The method according to claim 2, wherein said storage devices are disk drives.

4. The method according to claim 1, wherein said step of unloading comprises the steps of:

reading blocks of data from a respective database table, and storing the data blocks read in an export directory.

5. The method according to claim 4, wherein said step of unloading further comprises the steps of:

determining success of completion said steps of reading and storing; and (1) stopping each of said threads, if said determining success step indicates non-completion, (2) performing an internal TS Reorganization on the table.

6. The method according to claim 1, further comprising the step of:

repeating said steps of assigning and unloading until each of the database tables is unloaded.

7. The method according to claim 1, further comprising the steps of:

exporting other objects related to each of said tables; and dropping said tables.

8. The method according to claim 1, wherein said step of loading comprises the steps of:

determining threads for loading data into database tables;

creating temporary tables, each temporary table corresponding to a set of data stored in an export directory;

launching a loading process in conjunction with each thread for loading each temporary table;

loading each temporary table with the data stored in the corresponding export directory via the corresponding loading process.

9. The method according to claim 8, further comprising the steps of:

determining success of the loading step for a respective database table; and if said step of loading was unsuccessful, performing the steps of:

(1) stopping each of said threads, if said determining success step indicates non-completion, (2) performing an internal TS Reorganization on the table.

10. The method according to claim 8, further comprising the steps of creating, launching and loading until each table is loaded.

11. The method according to claim 8, further comprising the steps of:

recognizing a fault in said step of loading, and performing the steps of:

(1) recognizing unsuccessfully loaded tables; and (2) performing an internal TS Reorganization on the unsuccessfully loaded tables.

12. The method according to claim 8, wherein said step of determining includes the steps of:

retrieving a number of threads input by a user;

determining a number of export directories; and establishing a number of threads equal to the lesser of the number of threads retrieved and the number of export directories.

13. A computer readable medium having computer instructions stored thereon that, when loaded into a computer exhibiting a symmetrical multi-processing environment having a plurality of CPU's, cause the computer to reorganize database tables, by performing the steps of:

launching a number of threads to process said database tables;

assigning each of said database tables to a different corresponding thread of said threads;

unloading each respective database table by a process of the corresponding thread, wherein said threads operate on different CPU's in parallel; and loading said database tables.

14. The computer readable medium according to claim 13, wherein said step of launching comprises the steps of:

identifying a number of export directories located on separate storage devices that maintain said database tables; and utilizing as said number of threads.

15. The computer readable medium according to claim 14, wherein said storage devices are disk drives.

16. The computer readable medium according to claim 13, wherein said step of unloading comprises the steps of:

reading blocks of data from a respective database table, and storing the data blocks read in an export directory.

17. The computer readable medium according to claim 16, wherein said step of unloading further comprises the steps of:

determining success of completion said steps of reading and storing; and (1) stopping each of said threads, if said determining success step indicates non-completion, (2) performing an internal TS Reorganization on the table.

18. The computer readable medium according to claim 13, wherein said step of unloading further comprises the step of:

repeating said steps of assigning and unloading until each of the database tables is unloaded.

19. The computer readable medium according to claim 13, wherein said step of unloading further comprises the steps of:

exporting other objects related to each of said tables; and dropping said tables.

20. The computer readable medium according to claim 13, wherein said step of loading comprises:

determining threads for loading data into database tables;

creating temporary tables, each temporary table corresponding to a set of data stored in an export directory;

launching a loading process for loading each temporary table;

loading each temporary table with the data stored in the corresponding export directory via the corresponding loading process.

21. The computer readable medium according to claim 20, wherein said instructions stored thereon, when loaded into a computer, further cause the computer to perform the steps of:

determining success of the loading step for a respective database table; and if said step of loading was unsuccessful, performing the steps of:

(1) stopping each of said threads, if said determining success step indicates non-completion, (2) performing an internal TS Reorganization on the table.

22. The computer readable medium according to claim 20, wherein said instructions stored thereon, when loaded into a computer, further cause the computer to perform the step of repeating said steps of creating, launching and loading until each table is loaded.

23. The computer readable medium according to claim 20, wherein said instructions stored thereon, when loaded into a computer, further cause the computer to perform the step of:

recognizing a fault in said step of loading, and performing the steps of:

(1) recognizing unsuccessfully loaded tables; and (2) performing an internal TS Reorganization on the unsuccessfully loaded tables.

24. The computer readable medium according to claim 20, wherein said step of determining includes the steps of:

retrieving a number of threads input by a user;

determining a number of export directories; and establishing a number of threads equal to the lesser of the number of threads retrieved and the number of export directories.

25. An apparatus for reorganizing database tables maintained in a system exhibiting a symmetrical multi-processing environment having a plurality of CPU's, comprising:

means for launching a number of threads to process said database tables;

means for assigning each of said database tables to a different corresponding thread of said threads;

means for unloading each respective database table by a process of the corresponding thread, wherein said threads operate on different CPU's in parallel; and means for loading said database tables.

26. The apparatus according to claim 25, wherein said means for launching further includes means for retrieving a number of threads to launch from a user.

27. The apparatus according to claim 25, wherein said means for launching includes means for limiting the number of threads launched to a number of export directories located on separate storage devices of said system.

28. The apparatus according to claim 25, wherein said means for unloading comprises:

means for reading blocks of data from a respective database table, and storing the data blocks read in an export directory associated with the corresponding thread.

29. The apparatus according to claim 25, further comprising means for repeatedly assigning respective database tables to corresponding threads and unloading each respective table until all of said database tables have been unloaded.

30. An apparatus for reorganizing database tables in a symmetrical multi-processing environment having a plurality of CPU's, comprising:

a launching device configured to initiate a number of threads to process said database tables;

an assignor configured to assign each of said database tables to a different corresponding thread of said threads launched;

an unloader installed on each corresponding thread, each respective unloader configured to unload each of said database tables by a process of said corresponding thread of said unloader, wherein said threads operate on different CPU's in parallel; and a loader configured to load said database tables.

31. The apparatus according to claim 30, wherein said launching device includes:

a user interface configured to retrieve a number of threads to launch from a user; and a limit device configured to limit the number of threads to launch to a number of export directories located on separate storage devices of said system.

32. The apparatus according to claim 30, wherein each respective unloader comprises:

a read device configured to read blocks of data maintained within tables assigned to a same thread as the respective unloader is installed; and a write device configured to store the data blocks read into an export directory corresponding to the same thread as the respective unloader is installed.

33. The apparatus according to claim 30, wherein said assignor assigns a database table to each of said threads, and, upon completion of one of said threads, assigns another of said database tables to one of said initiated threads until each database table has been assigned.

34. The apparatus according to claim 32, wherein said loader is loaded and executed on each of said threads after each database table has been unloaded, each loader configured to, read data blocks stored in an export directory corresponding to the thread executing the loader, and save the datablocks in fresh tablespace.

35. A method for reorganizing database tables residing on different storage devices in a symmetrical multi-processing environment having a plurality of CPU's, at least one of said tables residing on a plurality of storage devices, comprising the steps of:

launching a number of threads to process said database tables;

assigning each respective portion of said database tables residing on a different storage device to a different corresponding thread of said threads;

unloading each respective portion of said database tables by a process of said corresponding thread, wherein said threads operate on different CPU's in parallel; and loading said database tables.

36. A computer readable medium having computer instructions stored thereon that, when loaded into a computer exhibiting a symmetrical multi-processing environment having a plurality of CPU's, cause the computer to reorganize database tables residing on different storage devices, at least one of said tables residing on a plurality of storage devices, by performing the steps of:
  launching a number of threads to process said database tables;
  assigning each respective portion of said database tables residing on a different storage device to a different corresponding thread of said threads;
  unloading each respective portion of said database tables by a process of the corresponding thread, wherein said threads operate on different CPU's in parallel; and
  loading said database tables.

37. An apparatus for reorganizing database tables residing on different storage devices maintained in a system exhibiting a symmetrical multi-processing environment having a plurality of CPU's, at least one of said tables residing on a plurality of storage devices, comprising:
  means for launching a number of threads to process said database tables;
  means for assigning each respective portion of said database tables residing on a different storage device to a different corresponding thread of said threads;
  means for unloading each respective portion of said database tables by a process of the corresponding thread, wherein said threads operate on different CPU's in parallel; and
  means for loading said database tables.

38. An apparatus for reorganizing database tables residing on different storage devices in a symmetrical multi-processing environment having a plurality of CPU's, at least one of said tables residing on a plurality of storage devices, comprising:
  a launching device configured to initiate a number of threads to process said database tables;
  an assignor configured to assign each respective portion of said database tables residing on a different storage device to a different corresponding thread of said threads launched;
  an unloader installed on each corresponding thread, each respective unloader configured to unload each respective portion of said database tables by a process of said corresponding thread of the unloader, wherein said threads operate on different CPU's in parallel; and
  a loader configured to load said database tables.

39. A method for reorganizing database tables in a symmetrical multi-processing environment having a plurality of CPU's, comprising:
  launching a first set of threads to unload said database tables;
  assigning each of said database tables to a different corresponding thread of said first set of threads;
  unloading each of said database tables to a separate export directory by a process of said corresponding thread, said first set of threads operate in parallel on a first set of CPU's, said database tables assigned to said export directories using a best fit method, said assignment performed by a reorganization utility running on a CPU separate from said first set of CPU's;
  creating temporary database tables;
  launching a second set of threads to load said temporary database tables; and
  loading each of said temporary database tables with data from at least one of said export directories, each of said temporary database tables loaded by a separate thread of said second set of threads, said second set of threads operate in parallel on a second set of CPU's, said data loaded using a best fit method.

40. A computer readable medium having computer instructions stored thereon that, when loaded into a computer exhibiting a symmetrical multi-processing environment having a plurality of CPU's, cause the computer to reorganize database tables by performing the steps of:
  launching a first set of threads to unload said database tables;
  assigning each of said database tables to a different corresponding thread of said first set of threads;
  unloading each of said database tables to a separate export directory by a process of said corresponding thread, said first set of threads operate in parallel on a first set of CPU's, said database tables assigned to said export directories using a best fit method, said assignment performed by a reorganization utility running on a CPU separate from said first set of CPU's;
  creating temporary database tables;
  launching a second set of threads to load said temporary database tables; and
  loading each of said temporary database tables with data from at least one of said export directories, each of said temporary database tables loaded by a separate thread of said second set of threads, said second set of threads operate in parallel on a second set of CPU's, said data loaded using a best fit method.

41. An apparatus for reorganizing database tables maintained in a system exhibiting a symmetrical multi-processing environment having a plurality of CPU's, comprising:
  means for launching a first set of threads to unload said database tables;
  means for assigning each of said database tables to a different corresponding thread of said first set of threads;
  means for unloading each of said database tables to a separate export directory by a process of said corresponding thread, said first set of threads operate in parallel on a first set of CPU's, said database tables assigned to said export directories using a best fit method, said assignment performed by a reorganization utility running on a CPU separate from said first set of CPU's;
  means for creating temporary database tables;
  means for launching a second set of threads to load said temporary database tables; and
  means for loading each of said temporary database tables with data from at least one of said export directories, each of said temporary database tables loaded by a separate thread of said second set of threads, said second set of threads operate in parallel on a second set of CPU's, said data loaded using a best fit method.

42. An apparatus for reorganizing database tables in a symmetrical multi-processing environment having a plurality of CPU's, comprising:
  a first launching device configured to initiate a first set of threads to unload said database tables;
  an assignor configured to assign each of said database tables to a different corresponding thread of said first set of threads launched;
  an unloader installed on each thread of said first set of threads, each unloader configured to unload at least one of said database tables to a separate export directory by a process of said corresponding thread of said unloader, said first set of threads operate in parallel on a first set of CPU's, said database tables assigned to said export directories using a best fit method, said assignment performed by a reorganization utility running on a CPU separate from said first set of CPU's;

a table allocation device configured to create temporary database tables;

a second launching device configured to initiate a second set of threads to load said temporary database tables; and a loader installed on each thread of said second set of threads, each loader configured to load at least one of said temporary database tables with data from at least one of said export directories, each of said temporary database tables loaded by a process of said corresponding thread of said loader, said second set of threads operate in parallel on a second set of CPU's, said loaders using a best fit method.

43. A machine-implemented method for reorganizing database tables in a symmetrical multi-processing environment having a plurality of CPU's, comprising:

launching a plurality of threads;

assigning each of said threads to a database table;

unloading said tables concurrently, wherein data of each table is unloaded to an export directory by a process of said thread assigned to said table;

creating new tables; and loading said new tables concurrently, wherein data of said export directories is loaded to said new tables by a process of said thread assigned to said table.

44. The method of claim 43, wherein indexes for said new tables are created concurrently with said method.

45. The method of claim 43, wherein said threads operate concurrently on a first set of said CPU's, said export directories selected by a reorganization utility running on a CPU separate from said first set of CPU's.

46. The method of claim 43, wherein said unloading step further comprises the steps of:

verifying that said unloading step was successful; and unloading said data by an alternative unload process if said unloading step was unsuccessful.

47. The method of claim 43, wherein said export directories reside on separate physical disks.

48. The method of claim 43, wherein a maximum number of said threads is selected by a user.

49. The method of claim 43, wherein said unloading to said export directory is performed using a best fit method.

50. The method of claim 43, wherein said loading to said new tables is performed using a best fit method.

51. A machine-implemented method for reorganizing database tables in a symmetrical multi-processing environment having a plurality of CPU's, comprising:

launching a plurality of threads;

assigning each of said threads to a database table;

unloading said tables concurrently, wherein data of each table is unloaded to an export directory by a process of said thread assigned to said table; and creating new tables.

* * * * *